United States Patent Office 3,826,640
Patented July 30, 1974

3,826,640
SUBSTITUTED BENZOYLPHOSPHONATES
AS HERBICIDES
Robert J. Theissen, Westfield, N.J., assignor to
Mobil Oil Corporation
No Drawing. Filed Aug. 10, 1971, Ser. No. 170,636
Int. Cl. A01n 9/36
U.S. Cl. 71—86                        6 Claims

ABSTRACT OF THE DISCLOSURE

Substituted benzoylphosphonates form a class of compounds which exhibit herbicidal activity, and, of which, certain substituted benzoylphosphonates are novel compounds. In herbicide tests, the compounds of this invention are highly effective against undesirable grasses, such as Crabgrass, Yellow Foxtail grass, Johnson grass and Barnyard grass; and against undesirable broadleaf herbs, such as Pigweed. In low use concentrations, the compounds of the present invention retain their high effectiveness against undesirable grasses and broadleaf herbs while showing selectivity in favor of important crop species, such as cotton and corn.

BACKGROUND OF THE INVENTION

Field of the Invention

This invention is directed to the use of certain substituted benzoylphosphonates as herbicides, and, especially, to use of such compounds in low use concentration as selective crop herbicides. It is further directed to a certain group of such substituted benzoylphosphonates which are novel compounds useful as herbicides, and, especially, selective crop herbicides.

Description of the Prior Art

Certain phenoxyacetylphosphonates are disclosed to exhibit pesticidal properties in U.S. Pat. Nos. 3,382,060 and 3,378,610, and Netherlands Pat. No. 6,516,265.

Certain benzoylphosphonates are disclosed in U.S. Pat. Nos. 2,900,296 and 2,924,553 as nematocides, and are structured as follows:

(1)

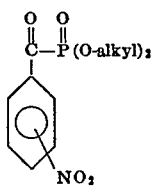

U.S. Pat. No. 2,900,296

(2)

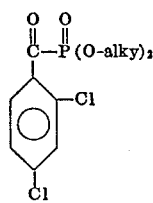

U.S. Pat. No. 2,924,553.

U.S. Pat. No. 3,013,054 discloses 3,6-dichloro-2-methoxybenzoic acid as a non-selective herbicide.

SUMMARY OF THE INVENTION

This invention provides for use as herbicides, and, especially, at low use concentration, as selective crop herbicides, compounds having the following structural formula

3)

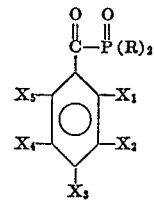

wherein R is a member selected from the group consisting of alkoxy of 1–5 carbon atoms, alkyl of 1–5 carbon atoms and halo (e.g., fluoro, chloro and bromo) alkoxy of 1–5 carbon atoms, and $X_1$, $X_2$, $X_3$, $X_4$ and $X_5$ are members selected from the group consisting of hydrogen, alkoxy of 1–5 carbon atoms, halogen (e.g., fluorine, chlorine, bromine and iodine) and combinations thereof; and herbicidal compositions comprising at least one such compound and a carrier therefor.

This invention also embodies, as novel compounds, the compounds having the above structural formula (3) wherein R is a member selected from the group consisting of alkoxy of 1–5 carbon atoms, alkyl of 1–5 carbon atoms and halo (e.g., fluoro, chloro and bromo) alkoxy of 1–5 carbon atoms, $X_1$ and $X_3$ are members selected from the group consisting of hydrogen, alkoxy of 1–5 carbon atoms and combinations thereof, and $X_2$, $X_4$ and $X_5$ are members selected from the group consisting of hydrogen, alkoxy of 1–5 carbon atoms, halogen (e.g., fluorine, chlorine, bromine and iodine) and combinations thereof.

DESCRIPTION OF SPECIFIC EMBODIMENTS

As will be noted from the formula (3), the compounds of the present invention are substituted benzoylphosphonates. Non-limiting examples of the compounds, some of which are novel, embodied for use in this invention include:

O,O-Dimethyl-2,3,6-trichlorobenzoylphosphonate;
O,O-Diethyl-2,6-dichlorobenzoylphosphonate;
O,O-Diethyl-2,3,5-triiodobenzoylphosphonate;
O,O-Dipentyl-3,6-dichloro-2-methoxy-
  benzoylphosphonate;
O,O-Dimethyl-3-chloro-2,6-dimethoxy-
  benzoylphosphonate;
O,O-Di-2-chloroethyl-3,5-dichlorobenzoylphosphonate;
O,O-Dimethyl-3,6-dibromo-2-methoxy-
  benzoylphosphonate;
Diethyl-3,6-dichloro-2-methoxybenzoylphosphonate;
Dibutyl-2-bromo-3,5-dichlorobenzoylphosphonate;
O,O-Dimethyl-4-fluorobenzoylphosphonate;
O,O-Dimethyl-2,5-difluorobenzoylphosphonate; and
O,O-Dimethyl-2,5-dibromobenzoylphosphonate.

The compounds of this invention are highly effective against undesirable herbs (e.g., grasses, broadleaf weeds, etc.) at high as well as low use concentrations, and, as compared to similar commercial compounds such as, in particular, the substituted benzoic acid, 3,6-dichloro-2-methoxybenzoic acid, the compounds of this invention retain substantially high activity as herbicides at relatively low use concentrations, such as, for example, about one pound per acre, while also showing selectivity in favor of important crops, such as, for example, cotton and corn.

The compounds of this invention are readily prepared by the reaction of an appropriately substituted benzoyl halide, such as, for example, 3,6-dichloro-2-methoxybenzoyl chloride, in a suitable solvent and in an inert atmosphere (e.g., nitrogen) with an appropriate phosphite, such as, for example, trimethylphosphite. Non-limiting examples of solvents for use in this reaction include benzene, toluene, ethyl ether, hexane and heptane. The reaction mixture is heated for a time and cooled. The solvent is then removed by vaporation and excess phosphite reactant is removed by either evaporation or distillation to yield the desired product, such as, for example, O,O - dimethyl-3,6-dichloro-2-methoxybenzoylphosphonate.

Using the above procedure, the following examples of specific compounds were prepared in order to illustrate this invention:

EXAMPLE 1

O,O-dimethyl-3,6-dichloro-2-methoxybenzoylphosphonate

To a 25° C. stirred solution of 3,6-dichloro-2-methoxybenzoyl chloride (11.98 g., 0.05 mole) in benzene (60 ml.) under a nitrogen atmosphere was added dropwise a solution of trimethylphosphite (6.85 g., 0.055 mole) in benzene (40 ml.). The mixture was heated to 60° C. for 24 hours, cooled, and the solvent and excess trimethylphosphite evaporated to yield 15.5 g. of dark oil product with IR analysis as follows: C=O, 1685; P=O, 1280; P=O, 1040 cm.$^{-1}$.

EXAMPLE 2

O,O-diethyl-3,6-dichloro-2-methoxybenzoylphosphonate

Following the same procedure as in Example 1, except with triethylphosphite as the reactant phosphite and distillation to remove the excess phosphite, 9.4 g. of off-white liquid product was obtained with a boiling point of 160° C. at 0.2 mm. Hg.

EXAMPLE 3

O,O-diisopropyl-3,6-dichloro-2-methoxybenzoylphosphonate

Following the same procedure as in Example 1, except with triisopropylphosphite as the reactant phosphite and distillation to remove the excess phosphite, 10.4 g. of off-white liquid product was obtained with a boiling point of 165–170° C. at 0.2 mm. Hg.

EXAMPLE 4

O,O-di-2-chloro-3,6-dichloro-2-methoxybenzoylphosphonate

Following the same procedure as in Example 1, except with tris-2-chloroethylphosphite as the reactant phosphite and distillation to remove the excess phosphite, 8.5 g. of off-white liquid product was obtained with a boiling point of 209–212° C. at 0.3 mm. Hg.

In illustration of this invention, the embodiments of the specific examples 1–4 were subjected to tests for herbicidal activity as described hereinafter with the test results being set forth in the Table following the test description. For comparison purposes, the Table includes results obtained in the identical test with a commercial similar compound, i.e., 3,6-dichloro-2-methoxybenzoic acid, which illustrates the excellent retention of activity of the compounds of the present invention at low use concentrations with selectivity in favor of important crops.

HERBICIDE TESTING METHODS

The test species propagated for testing are:

Crabgrass (hereinafter CG)
Yellow Foxtail grass (hereinafter YF)
Johnson grass (hereinafter JG)
Barnyard grass (hereinafter BG)
Pigweed (hereinafter PW)
Turnip (hereinafter TP)
Cotton (hereinafter CT)
Corn (hereinafter CN)
Bean (hereinafter BN)

Each specie is planted individually in 3″ plastic pots containing potting soil. Four seeds each of the CN, BN and CT are seeded to a depth equal to the diameter of the seed. The other species are surface seeded and sprinkled with screened soil in an amount sufficient to cover the seed. Immediately after planting, all pots are watered by sub-irrigation in greenhouse trays. Pots for the pre-emergence phase of testing are seeded one day before treatment.

Planting dates for the post-emergence phase of testing are varied so that all seedlings will reach the desired stage of development simultaneously. The proper stage of development for treatment in the post-emergence tests is as follows:

Grasses (e.g., CG, YF, JG and BG)—2 inches in height
PW and TP:—1 or 2 true leaves visible above cotyledons
CT:—first true leaf 1 inch in length; expanded cotyledons
CN:—3 to 4 inches in height
BN:—Primary leaves expanded, growing point at primary leaf node.

Spray applications are made in a hood containing a movable belt and fixed spray nozzle. For passage through the spray hood, one spot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened at rates of application equivalent to 8, 2 and 1 pounds actual/acre in a spray volume of 38 gal./acre. Spray hood constants required to deliver the above volume are as follows:

Belt speed: 2 m.p.h.
Air pressure: adjusted to provide 38 g.p.a. delivery
Nozzle tip: 8003E (provides uniform cross-section flat spray)

Formulations for spray applications (as used in the compositions for which data are set forth in the Table hereinafter) are prepared in 50 ml. volumes with the following components:

Eight Pounds per Acre Rate:

1. 1.24 grams compound
2. 49 ml. acetone as solvent
3. 1 ml. xylene-Atlox 3414 (surface-active emulsifier)

Two Pounds per Acre Rate:

1. 0.31 grams compound
2. 49 ml. acetone as solvent
3. 1 ml. xylene-Atlox 3414

One Pound per Acre Rate:

1. 0.155 grams compound
2. 49 ml. acetone as solvent
3. 1 ml. xylene-Atlox 3414

Compounds which are not available in sufficient quantity for machine spraying are applied by hand with a DeVilbiss atomizer.

Two weeks after treatment, a pre- and post-emergence injury or control is visually rated as percent injury or control (percent effectiveness).

TABLE.—PRE/POST-EMERGENCE HERBICIDAL ACTIVITY (PERCENT EFFECTIVENESS)

| Compound of Example | Compound concentration, lbs./acre | Grasses | | | | Broadleaves | | Crops | | |
|---|---|---|---|---|---|---|---|---|---|---|
| | | CG | YF | JG | BG | PW | TP | CT | CN | BN |
| 1 | 2 | 100/30 | —/— | 80/100 | 60/90 | —/— | 100/100 | 30/100 | 100/100 | 90/100 |
|   | 1 | 50/— | —/— | —/— | 50/— | 80/— | 80/— | 0/— | 0/— | 40/— |
| 2 | 8 | 90/30 | 100/30 | 100/30 | 90/30 | 100/90 | 100/100 | 30/70 | 60/80 | 100/100 |
|   | 1 | 90/— | —/— | —/— | 80/— | 100/— | 90/— | 20/— | 20/— | 80/— |
| 3 | 8 | 20/30 | 70/30 | 90/30 | 60/30 | 100/100 | 60/70 | 30/80 | 40/30 | 100/100 |
| 4 | 8 | 90/30 | 100/30 | 100/50 | 90/30 | 100/100 | 80/100 | 60/80 | 80/30 | 100/100 |
|   | 1 | 90/— | —/— | —/— | 80/— | 100/— | 100/— | 20/— | 0/— | 90/— |
| Comparison compound* | 1 | 90/— | —/— | —/— | 90/— | 100/— | 90/— | 90/— | 20/— | 100/— |

*3,6-dichloro-2-methoxybenzoic acid.

From the data in the above table, it will be noted that the substituted benzoylphosphonates of this invention have a broad range of both pre- and post-emergence herbicidal activity. The specific embodiments of these compounds used for testing, those of specific examples 1, 2, 3 and 4, show high effectiveness against Crabgrass, Yellow Foxtail grass and Barnyard grass, annual grass weeds which reproduce by seeds and are problems in lawns and field crops. They also prove highly effective against Johnson grass, a perennial grass weed which reproduces by seed and underground rhizomes and is primarily a problem in field crops. Also, they prove to be effective against Pigweed, an annual broadleaf weed which reproduces by seed and is one of the most serious broadleaf weed problems in major agronomic crops.

The high effectiveness against undesirable herbs is maintained, it will be noted, even at the low use concentration of 1 pound per acre. At this low concentration, however, the compounds of this invention prove selective in favor of important crops, such as cotton and corn. From the data in the above table, the compounds of examples 1, 2 and 4 at 1 pound per acre in pre-emergence application show only nil to 20 percent effectiveness against cotton and corn while effectively controlling the weed species of the test. The commercial compound used for comparison proved 90 percent effective against cotton.

The compounds of this invention are disclosed for use in various ways to achieve pre-emergence or post-emergence contact control of undesirable herbs. They can be applied as the toxic components in herbicidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the herbicidal compositions. Non-limiting examples of liquid carriers include water, organic oils such as kerosene, light oils and medium oils, and vegetable oils such as cottonseed oil. Non-limiting examples of solid carriers include talc, bentonite, diatomaceous earth, pyrophyllite, fullers earth, gypsum, flours derived from cotton seeds, and nut shells and various natural and synthetic clays having a pH not exceeding about 9.5.

The amount of the compounds of this invention utilized in herbicidal compositions will vary rather widely. It depends to some extent upon the type of composition in which the material is being used, the nature of the condition to be controlled, and the method of application (i.e., spraying, dusting, etc.). In the ultimate herbicidal compositions, as applied in the field, herbicide concentrations as low as 0.0001 weight percent of the total composition can be used. In general, compositions, as applied, containing about 0.05 weight percent herbicide in either liquid or solid carrier give excellent results. In some cases, however, stronger dosages up to about 10 weight percent may be required.

In practice, herbicidal compositions are usually prepared in the form of concentrates, which are diluted in the field to the concentration desired for application. For example, the concentrate can be a wettable powder containing large amounts of a compound of this invention, a carrier (e.g., attapulgite or other clay) and wetting and dispersing agents. Such a powder can be diluted prior to application, by dispersing it in water to obtain a sprayable suspension containing the concentration of herbicide desired for application. Other concentrates can be solutions that can be later diluted, e.g., with kerosene. Thus, it is within the contemplation of this invention to provide herbicidal compositions containing up to about 80 percent, by weight of the composition, of a herbicidal compound of this invention. Accordingly, depending upon whether it is ready for application or it is in concentrated form, the contemplated herbicidal compositions contain between about 0.0001 percent and about 80 percent, by weight of the composition, of a herbicidal compound of this invention, and a carrier, liquid or solid, as defined hereinbefore.

Although the present invention has been described with preferred embodiments, it is to be understood that modifications and variations may be resorted to without departing from the spirit and scope of this invention, as those skilled in the art will readily understand.

What is claimed is:

1. A method for combatting undesirable herbs which comprises contacting them with a herbicidally effective amount of a compound having the following structural formula:

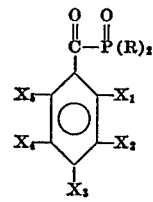

wherein R is a member selected from the group consisting of alkoxy of 1–5 carbon atoms, alkyl of 1–5 carbon atoms and haloalkoxy of 1–5 carbon atoms, $X_1$ and $X_3$ are members selected from the group consisting of hydrogen, alkoxy of 1–5 carbon atoms and combinations thereof and $X_2$, $X_4$ and $X_5$ are members of the group consisting of hydrogen, alkoxy of 1–5 carbon atoms, halogen and combinations thereof.

2. A method as defined in Claim 1, wherein R is alkoxy of 1–5 carbon atoms, and X1 is alkoxy of 1–5 carbon atoms, and $X_2$, $X_3$, $X_4$, and $X_5$ are fluorine, chlorine, bromine, iodine or hydrogen and combinations thereof.

3. A method as defined in Claim 1, wherein R is methoxy, $X_1$ is methoxy, $X_2$ and $X_5$ are halogen and $X_3$ and $X_4$ are hydrogen.

4. A method as defined in Claim 1, wherein R is ethoxy, $X_1$ is methoxy, $X_2$ and $X_5$ are halogen and $X_3$ and $X_4$ are hydrogen.

5. A method as defined in Claim 1, wherein R is isopropoxy, $X_1$ is methoxy, $X_2$ and $X_5$ are halogen and $X_3$ and $X_4$ are hydrogen.

6. A method as defined in Claim 1, wherein R is 2-chloroethoxy, $X_1$ is methoxy, $X_2$ and $X_5$ are halogen and $X_3$ and $X_4$ are hydrogen.

References Cited

UNITED STATES PATENTS

| 2,924,553 | 2/1960 | Baker et al. | 424—214 |
| 3,664,822 | 5/1972 | Gier | 71—86 |

JAMES O. THOMAS, Jr., Primary Examiner

U.S. Cl. X.R.

260—606.5 P, 941, 951, 961

PO-1050
(5/69)

UNITED STATES PATENT OFFICE
CERTIFICATE OF CORRECTION

Patent No. 3,826,640          Dated July 30, 1974

Inventor(s) ROBERT J. THEISSEN

It is certified that error appears in the above-identified patent and that said Letters Patent are hereby corrected as shown below:

Column 3, line 31 "P = O, 1040" should be P-O, 1040 --.

Column 3 Example 4 "O,O-DI-2 CHLORO" should be -- O,O-DI-2 CHLOROETHYL --.

Column 4 line 32 "spot" should be -- pot --.

Column 6, claim 2 "X1" should be -- $X_1$ --.

Signed and sealed this 19th day of November 1974.

(SEAL)
Attest:

McCOY M. GIBSON JR.
Attesting Officer

C. MARSHALL DANN
Commissioner of Patents